United States Patent Office 3,107,262
Patented Oct. 15, 1963

3,107,262
ALKYL ACID PHOSPHATE SALTS
Leo K. Rochen, 40—33 23rd St., Long Island City, N.Y.
No Drawing. Filed Jan. 25, 1962, Ser. No. 168,802
6 Claims. (Cl. 260—461)

This invention relates to acid addition salts of nitrogenous basic compounds classified according to their physiological action as: antihistamines, analeptics, alkaloids, ataractics, anorectics, vasoconstrictors, narcotics, etc.; and more particularly to novel addition salts of amphetamine, methamphetamine, pheniramine, phenyl propanolamine, phenylephrine, ephedrine, quinidine, codeine, etc.

This application is a continuation-in-part of my pending application Serial No. 824,768 filed July 3, 1959, now forfeited.

The present invention is directed especially to addition salts of the above mentioned bases with alkyl acid phosphates, i.e., partial esters having the general formula:

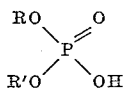

wherein R is the hydrocarbon radical of a fatty alcohol having from 8 to 18 carbon atoms, either saturated or containing olefinic double bonding; and R' is either hydrogen or a hydrocarbon radical of the same class as R.

Typical of the hydrocarbon radicals designated by R and R' aforesaid are: 2-ethylhexyl, iso-octyl, octyl, lauryl, palmityl, stearyl, oleyl, etc.

The acid addition salts are formed by the interaction of the alkyl acid phosphate with a stoichiometric quantity of the base so as completely to neutralize the acid function. Thus, where the ester is dibasic, as in the case of the mono ester, a salt is formed by the interaction of 1 mole of the ester and 2 moles of a monobasic base. Where the base is dibasic and the ester is monobasic, as in the case of the diester, the salt is formed by the interaction of 2 moles of the ester and one mole of the base. Where the ester is mono-basic, as in the case of the diester, and the base is mono-basic, the salt is formed by the interaction of 1 mole of the ester and 1 mole of the base.

The esters may be used in the form of products which consists of approximately equi-molar quantities of the mono ester and the diester. When such products are used, the amount of the base employed is stoichiometrically that required to produce a neutral product consisting of approximately equi-molar quantities of the salt of the mono ester and the salt of the diester.

The salts in accordance with the present invention are non-irritating and useful in a variety of therapeutic applications for which the bases or the known salts thereof are employed, such as the treatment of allergies, obesity, pain, nasal congestion, fatigue, narcolepsy, etc. Their use is characterized by the absence of undesirable side effects, and increased duration of the activity for which the bases or the known salts thereof are employed. I do not know precisely what is the cause of the marked absenec of side effects. It may be due to the fact that sometimes phosphates in general are metabolized more easily than sulfates when used to affect physiological processes in the body. The salts can be used per se or with a suitable excipient. I have found that the alkyl acid phosphates are useful as excipients. In the latter case, the alkyl acid phosphates as excipients may be provided by using an excess thereof over the stoichiometric amounts which form the neutral salts.

The salts in accordance with the instant invention may be prepared by mixing the alkyl acid phosphate with a stoichiometric amount of the desired base in the presence of a suitable liquid medium. Suitable media in which the salt formation is accomplished are generally polar solvents such as, for example, alcohols, as for instance methanol, isopropanol, etc., ketones as for instance acetone, methyl ethyl ketone, etc.

The following are examples in accordance with this invention.

Example 1

A solution of 40 grams of dl-amphetamine in 100 ml. of acetone is mixed with a solution of 301 grams of stearyl acid phosphate (the phosphate consisting of approximately equimolar quantities of mono- and di-stearyl phosphates) in 300 ml. of methanol. The solution of stearyl acid phosphate is prepared by dissolving the same in the methanol which is kept boiling under reflux at normal pressure. The solution formed by the mixture of the said two solutions is allowed to stand until it cools to room temperature, whereupon a white solid precipitate settles out. The precipitate is removed by filtration, and the filter cake is dried under vacuum to yield the amorphous product.

Example 2

A solution of 67 grams of levo amphetamine in 100 ml. of methanol is mixed with a solution of 301 grams of the stearyl acid phosphate in 150 ml. methanol, in accordance with the procedure described in Example 1. The solution formed by the mixture of the said two solutions is allowed to stand overnight. The solvent is then evaporated by heating on a water bath. The resulting amorphous solid is air dried.

Example 3

To a solution of 12.0 grams of chloro-pheniramine, 1-(p-chlorophenyl)-1-(2-pyridyl)-3 - (2 - dimethylaminoethyl)-propane, in 150 ml. of isopropanol, there is added a solution of 60.2 grams of the stearyl acid phosphate in 150 ml. of isopropanol, in accordance with the procedure described in Example 1. After cooling to room temperature, the precipitated solid is removed by filtration and vacuum dried.

Example 4

A solution of 70 grams of the stearyl acid phosphate used in Example 1 in 250 ml. acetone is mixed with 75 grams of methamphetamine base (Dextro-1 - phenyl - 2-methylamino-propane), and dissolution effectuated by boiling under reflux at normal pressure. On cooling, the resulting precipitated product is recovered by filtration and air dried to an amorphous powder.

Example 5

A solution of 90 grams of the stearyl acid phosphate used in Example 1 in 100 ml. of methylethyl ketone is mixed with a solution of 15 grams of phenylpropanolamine in 200 ml. acetone, and the dissolution effectuated in accordance with Example 4. On cooling, the resulting solid precipitate is recovered as in Example 4.

Example 6

A mixture of 30.0 grams of pyrilamine, 2-[(2-dimethylaminoethyl) (p-methoxybenzyl)]amino-pyridine, in 100 ml. of ethanol and 60.2 grams of the stearyl acid phosphate used in Example 1 in 200 ml. of ethanol is heated to effectuate dissolution and then allowed to cool. After standing overnight, the precipitated solid is removed by filtration and dried under vacuum.

Example 7

To a solution of 10.0 grams of pheniramine, 2-[α-(2-dimethylaminoethyl)-benzyl]-pyridine in 200 ml. of ethanol, there is added a solution of 65.0 grams of the stearyl acid phosphate in 200 ml. of ethanol in accordance with the procedure described in Example 1. After cooling, the precipitated solid is filtered off and vacuum dried.

*Example 8*

A mixture of 26.2 grams of methapyrilene, 2-[(2-dimethylaminoethyl)-2-thenyl-amino]pyridine in 350 ml. of n-butanol and 60.0 grams of stearyl acid phosphate are refluxed for one hour and allowed to cool. The precipitated solid is removed by filtration and air dried.

*Example 9*

A solution of 60.2 grams of stearyl acid phosphate in 200 ml. of isopropanol is mixed with a solution of 16.5 grams of l-ephedrine base in 300 ml. of isopropanol; heated to effect solution. On cooling the salt precipitates. The solid is filtered free of alcohol and air dried.

*Example 10*

A mixture of 32.4 grams of quinidine base in 500 ml. of ethyl methyl ketone and 60.2 grams of stearyl acid phosphate is heated to solution and cooled. The solid is removed by filtration and air dried.

*Example 11*

A solution of 60.2 grams of stearyl acid phosphate in 300 ml. of acetone is mixed with 30.0 grams of codeine base dissolved in 200 ml. of ethanol. The resulting precipitate is removed by filtration and air dried.

*Example 12*

A solution of 16 grams of phenylephrine in 100 ml. of acetone is mixed with a solution of 63.0 grams of stearyl acid phosphate in 250 ml. of isopropanol. After standing overnight, the solid precipitate is removed by filtration and air dried.

It will be understood that the foregoing description of the invention and the examples set forth are merely illustrative of the principles thereof. Accordingly, the appended claims are to be construed as defining the invention within the full spirit and scope thereof.

I claim:

1. An acid addition salt of a nitrogenous base selected from the group consisting of amphetamine, methamphetamine, phenylpropanolamine, ephedrine and phenylephrine, with an alkyl acid phosphate having the formula

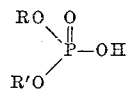

wherein R is the hydrocarbon residue of a fatty alcohol having from 8 to 18 carbon atoms and R' is a member of the group consisting of hydrogen and the hydrocarbon residue of a fatty alcohol having from 8 to 18 carbon atoms.

2. Acid addition salt of amphetamine with stearyl acid phosphate.

3. Acid addition salt of methamphetamine with stearyl acid phosphate.

4. Acid addition salt of phenylpropanolamine with stearyl acid phosphate.

5. Acid addition salt of phenylephrine with stearyl acid phosphate.

6. Acid addition salt of ephedrine with stearyl acid phosphate.

No references cited.